(12) United States Patent
Erpenbeck et al.

(10) Patent No.: US 11,168,722 B2
(45) Date of Patent: Nov. 9, 2021

(54) DEVICE FOR COMPENSATING FOR TOLERANCES

(71) Applicant: WITTE AUTOMOTIVE GMBH, Velbert (DE)

(72) Inventors: Till Erpenbeck, Velbert (DE); Jan Christian Kucharski, Wuppertal (DE)

(73) Assignee: WITTE AUTOMOTIVE GMBH, Velbert (DE)

( * ) Notice: Subject to any disclaimer, the term of this patent is extended or adjusted under 35 U.S.C. 154(b) by 234 days.

(21) Appl. No.: 16/338,352

(22) PCT Filed: Sep. 21, 2017

(86) PCT No.: PCT/EP2017/073940
§ 371 (c)(1),
(2) Date: Mar. 29, 2019

(87) PCT Pub. No.: WO2018/060055
PCT Pub. Date: Apr. 5, 2018

(65) Prior Publication Data
US 2019/0226507 A1 Jul. 25, 2019

(30) Foreign Application Priority Data
Sep. 30, 2016 (DE) .......................... 102016118640.6

(51) Int. Cl.
*F16B 5/02* (2006.01)
*F16B 41/00* (2006.01)
(52) U.S. Cl.
CPC .......... *F16B 5/0233* (2013.01); *F16B 5/0266* (2013.01); *F16B 41/002* (2013.01); *F16B 5/02* (2013.01)

(58) Field of Classification Search
CPC ...... F16B 5/0233; F16B 5/0266; F16B 21/18; F16B 21/20; F16B 37/02; F16B 39/14;
(Continued)

(56) References Cited

U.S. PATENT DOCUMENTS 1,365,945 A * 1/1921 Ogden .................. F16B 13/068
411/28
2,367,480 A * 1/1945 Beswick ................. F16B 39/36
411/433
(Continued)

FOREIGN PATENT DOCUMENTS

CH 151479 A 3/1932
DE 2054212 A 3/1971
(Continued)

OTHER PUBLICATIONS

Official Communication from German Patent and Trademark Office for related DE Application No. 102016118640.6; dated May 11, 2017; 11 pages.
(Continued)

*Primary Examiner* — Roberta S Delisle
(74) *Attorney, Agent, or Firm* — Wiggin and Dana LLP; Gregory S. Rosenblatt; Brian A. Pattengale

(57) ABSTRACT

The invention relates to a spring element for a device for compensating for tolerances between a first and a second component, characterized by at least one spring arm which has two opposite end regions along its longitudinal direction, wherein at least one of the end regions has a greater distance from a longitudinal central axis of the spring element than an intermediate section of the spring arm between the end regions, and wherein at least one of the end regions forms a corner which protrudes radially outwards.

16 Claims, 4 Drawing Sheets

(58) Field of Classification Search
CPC ........ F16B 41/002; F16B 5/02; E02F 9/2841; Y10S 411/918; Y10T 24/44026
USPC ....... 411/516, 517, 520, 525, 526, 528, 529, 411/546
See application file for complete search history.

(56) References Cited

U.S. PATENT DOCUMENTS

| | | | | |
|---|---|---|---|---|
| 2,596,952 | A * | 5/1952 | Crowther | F16B 13/025 411/61 |
| 2,762,252 | A * | 9/1956 | Karitzky | F16B 29/00 411/38 |
| 3,861,776 | A | 1/1975 | Deal | |
| 4,657,456 | A * | 4/1987 | Anquetin | F16B 13/061 411/38 |
| 5,474,479 | A * | 12/1995 | Bennett | H01R 13/187 439/843 |
| 5,667,413 | A | 9/1997 | Trafton | |
| 6,042,432 | A * | 3/2000 | Hashizawa | H01R 13/187 439/843 |
| 6,062,919 | A * | 5/2000 | Trafton | H01R 13/187 439/843 |
| 6,174,118 | B1 * | 1/2001 | Rebers | F16B 37/041 411/107 |
| 6,609,866 | B2 * | 8/2003 | Huang | F16B 13/001 411/30 |
| 7,226,263 | B2 * | 6/2007 | Schwarzbich | F16B 5/0233 403/374.3 |
| 8,202,033 | B2 * | 6/2012 | Choi | B62D 25/147 411/546 |
| 8,784,143 | B2 * | 7/2014 | Edgell | A61N 1/3752 439/843 |
| 8,864,432 | B2 * | 10/2014 | Figge | F16B 37/042 411/546 |
| 10,541,489 | B2 * | 1/2020 | Uppleger | H01R 43/16 |
| 2005/0047893 | A1 * | 3/2005 | Schwarzbich | F16B 5/0233 411/546 |
| 2010/0029143 | A1 * | 2/2010 | Cossette | H01R 13/426 439/745 |
| 2014/0357137 | A1 | 12/2014 | Sian et al. | |

FOREIGN PATENT DOCUMENTS

| | | |
|---|---|---|
| DE | 2930674 A1 | 2/1981 |
| DE | 202006012493 U1 | 11/2006 |
| DE | 102009044635 A1 | 12/2010 |
| DE | 102012102906 A1 | 10/2013 |
| DE | 102013216716 A1 | 2/2015 |
| EP | 1196068 B1 | 4/2001 |

OTHER PUBLICATIONS

International Search Report for related PCT Application No. PCT/EP2017/073940; dated Dec. 11, 2017; 3 pages.

* cited by examiner

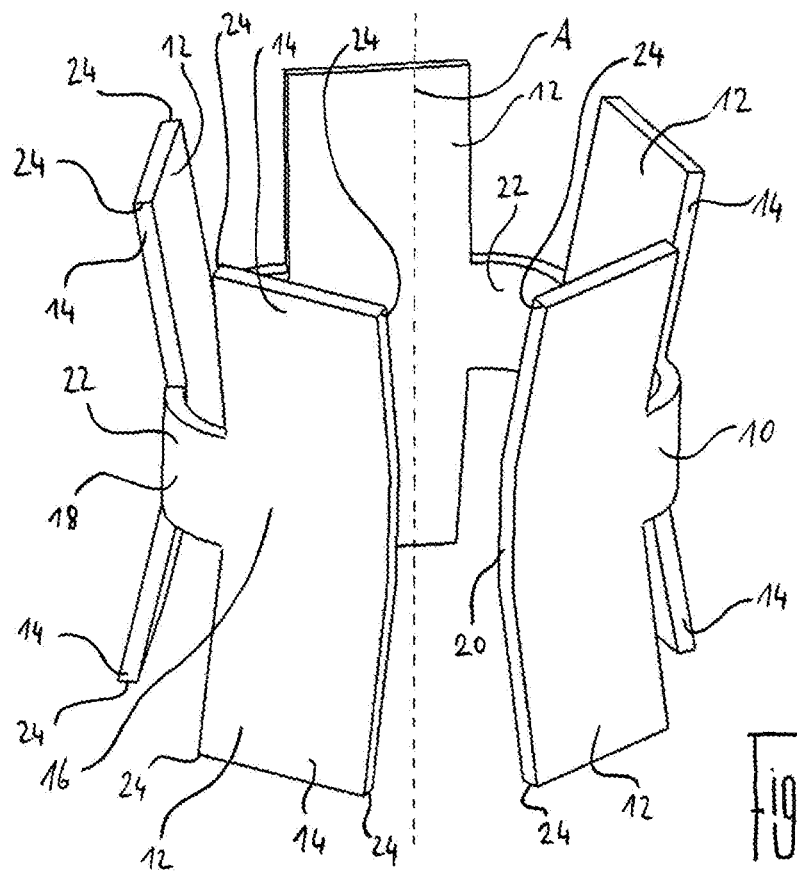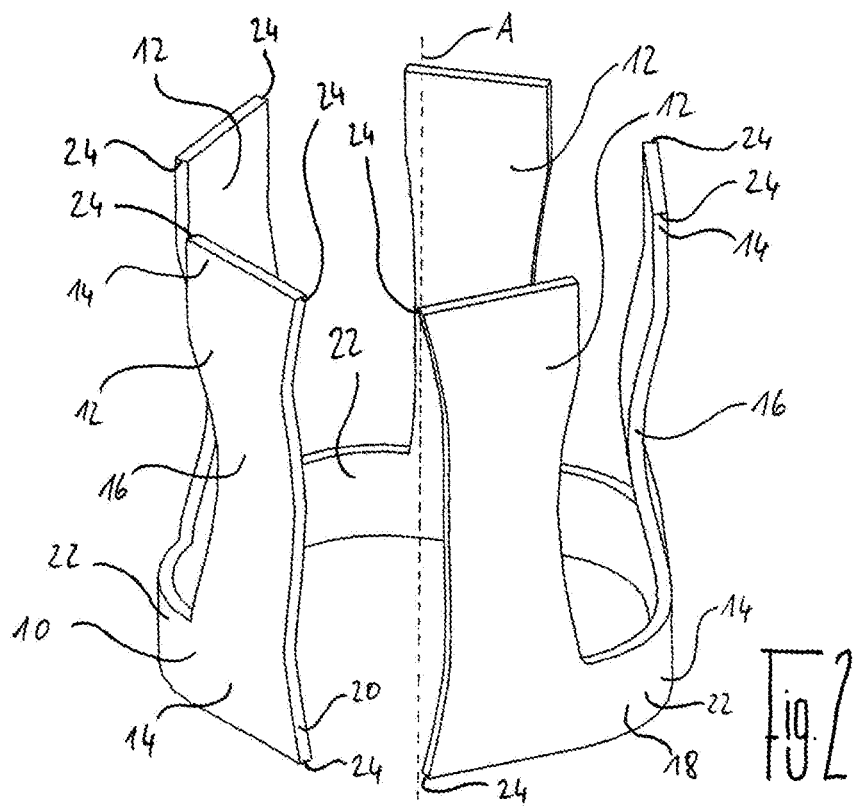

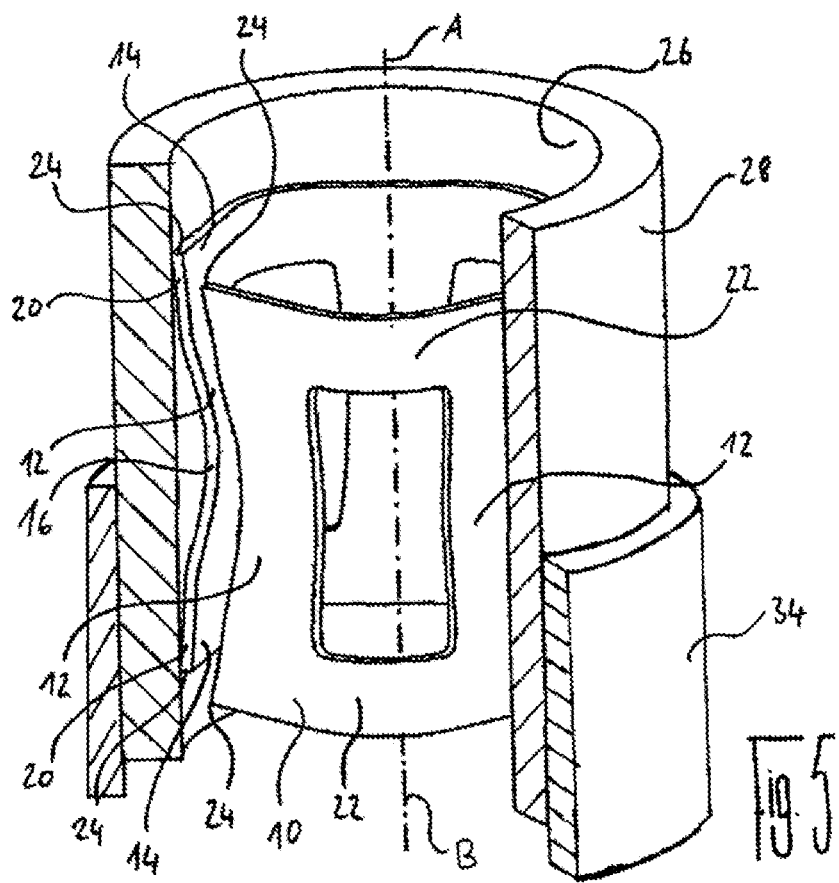
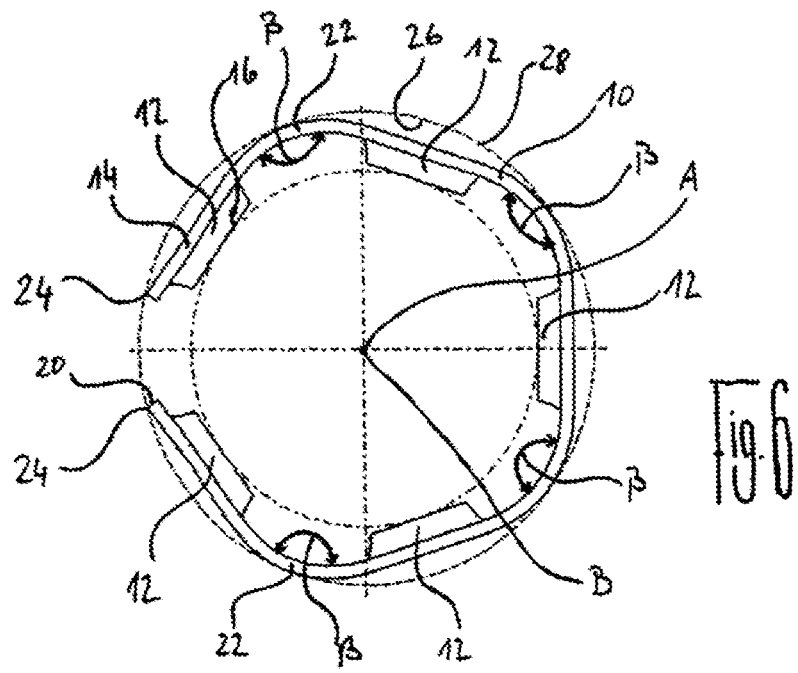

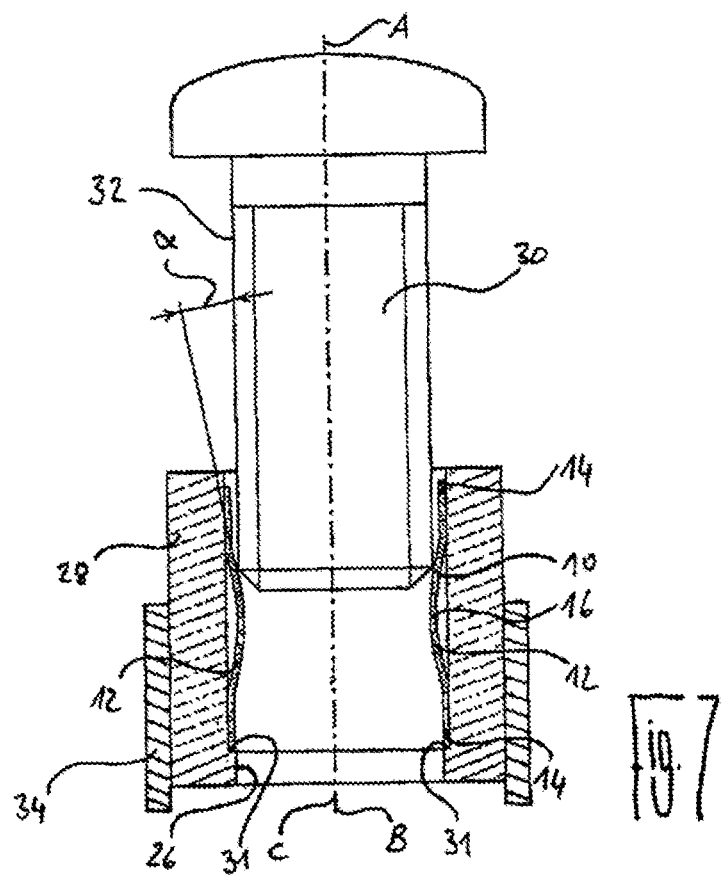
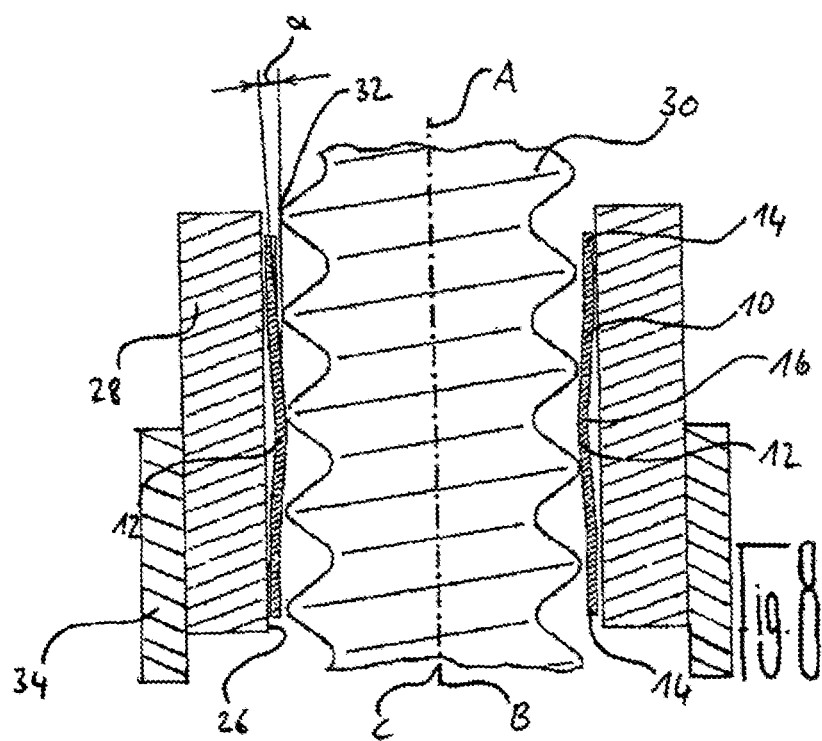

DEVICE FOR COMPENSATING FOR TOLERANCES

CROSS-REFERENCES TO RELATED APPLICATIONS

This patent application is a 371 of International Application No. PCT/EP2017/073940, filed Sep. 21, 2017 which claims the priority of German Application No. 102016118640.6, filed Sep. 30, 2016, each of which are incorporated herein by reference in their entirety.

The present invention relates to a device for compensating for tolerances between two components which will be connected.

Such devices are generally known. They have, by way of example, a base element which can be attached to the first component, and a compensating element which engages with the base element by means of a threading and which can be brought into contact with the other component by being rotated out of the base element. A connecting means, such as a connecting bolt or a threaded bolt which can be inserted through a passage in both the base element and the compensating element serves to connect the two components.

The compensating element is rotated out by turning the inserted connecting means. To achieve the necessary transmission of torque, a spring element is arranged in the passage of the compensating element, supported on one end thereof on the compensating element, while on the other end thereof pressing against the connecting means inserted through the passage.

With known spring elements to-date, effective transmission of torque is only possible down to a certain minimum size of the spring element. The constructed size of the device is therefore ultimately restricted.

An object of the invention is therefore to create a device having a spring element which can be manufactured simply and inexpensively, and which is particularly scalable towards smaller sizes.

The object is achieved by a device having the features of claim 1—particularly by a spring element having at least one spring arm which, seen in its longitudinal direction, has two opposite end regions, wherein at least one of the end regions has a greater distance from a longitudinal central axis of the spring element than an intermediate section of the spring arm between the end regions, and wherein at least one of the end regions forms a corner which protrudes radially outwards.

The invention is based on the finding that, by using a spring element with at least one spring arm, wherein at least one end region thereof has a greater distance from the longitudinal central axis of the spring element than an intermediate section between the end regions, it is possible to achieve a more efficient transmission of torque from the connecting means to the compensating element. This also has the additional advantage that the spring element can be more easily scaled to different sizes—and in particular, can be made more compact. Moreover, due to the different distances between the end region and the intermediate region relative to the longitudinal central axis, the connecting means can be inserted more easily into the spring element—in particular, without the risk of damaging the spring element.

Advantageous embodiments of the invention are described in the dependent claims, the description and the drawings.

Advantageously, the corner protrudes outwards to such an extent that it pushes into the compensating element when the spring element is situated in the passage. The corner can thus be "pinched" in the compensating element, such that the spring element is mounted non-rotatably in the passage.

Preferably, the spring element is arranged in the passage of the compensating element in such a manner that the longitudinal central axis of the spring element and a longitudinal central axis of the compensating element coincide at least approximately. So that the connecting means can be easily inserted into the passage, the spring arm preferably has a longitudinal extension, wherein the longitudinal extension of the spring arm and the longitudinal central axis are approximately in alignment. In this context, a longitudinal extension of a spring arm which is approximately in alignment with the longitudinal central axis of the spring element does not mean that the spring arm and the longitudinal central axis must run exactly parallel to one another. Rather, the spring arm can have a certain curvature or deflection which co-determines the spring characteristics, as long as a primary longitudinal extension component of the spring arm is parallel to the longitudinal central axis.

Preferably, a plurality—and preferably at least three—spring arms are arranged around the longitudinal central axis of the spring element and connected to each other by means of a connecting ring.

Advantageously, not only at least one spring arm, but specifically each spring arm, as seen in the longitudinal direction, can have two opposite end regions, wherein at least one end region has a greater distance from the longitudinal central axis than an intermediate section of a spring arm between the end regions.

According to a first embodiment, the connecting ring is configured, as seen in the axial direction, between unconnected end regions of the spring arms. In other words, each spring arm has two opposite, unconnected end regions, and the connecting ring defines, to a certain extent, a waist of the spring element.

According to a second embodiment, each spring arm has only one unconnected end region, and the connecting ring connects the end regions which are opposite the unconnected end regions.

According to a third embodiment, both the one end regions and the opposite end regions are each connected by a connecting ring. The spring arms thus correspond to a certain degree to bilaterally supported beams which have a smaller area moment of inertia than a cantilevered beam. Since the area moment of inertia is directly proportional to the width of the beam and/or of the spring arm, and directly proportional to the cube of the thickness of the beam and/or of the spring arm, a more compact construction of a spring element can be achieved with a spring element according to the third embodiment.

The fact that the spring element according to the third embodiment has no free end regions effectively prevents mutual entanglement of a plurality of individual spring elements—for example, if stored in a container. In other words, the configuration prevents so-called "nesting."

Preferably, the connecting ring has a slot which is aligned at least approximately parallel to the longitudinal central axis of the spring element. The slot is preferably bounded by two adjacent spring arms, wherein the two spring arms bounding the slot as seen in the circumferential direction of the spring element can be moved towards each other while opposing a spring force of the slotted connecting ring, such that the connecting ring forms a spring ring. Allowing the two spring arms bounding the slot to move towards one another facilitates the insertion of the spring element into the passage of the compensating element.

It is advantageous for mounting the spring element in the passage in a manner preventing rotation if at least one end region of a spring arm facing the slot has a corner which protrudes radially outward. Specifically, because of the spring force of the slotted connecting ring, the corner which protrudes radially outward is pressed into the compensating element, such that the spring element engages with the compensating element by a force fit or a positive fit.

It should be understood that the spring element can also have a closed connecting ring—in which case, as already mentioned, corners of unconnected end regions which protrude radially outwards can contribute to the mounting of the spring element in the passage of the compensating element in a manner which prevents rotation.

Furthermore, if the spring element is made of a metal—in particular, of a spring steel and preferably of a non-rusting spring steel—this has a positive effect on the spring properties of the spring element.

If the spring element is manufactured from a spring steel, then a subsequent heat treatment can be dispensed with in the production of the spring element, thereby eliminating thermal distortion of the spring element. This aspect is particularly important for compact spring elements with small dimensions, as a heat distortion in such structures is particularly noticeable.

Moreover, greater hardness of the spring steel has a positive effect when an outwardly protruding corner is pressed into the compensating element, especially if the compensating element is made of a softer material such as a plastic or aluminum. In principle, however, the spring element can also be made of a different material, such as a plastic material.

The—or each—connecting ring advantageously extends in a plane which is aligned at least approximately perpendicular to the longitudinal central axis of the spring element. That is, the connecting ring has connecting sections which extend between the spring arms and which are situated at the same height. In principle, however, the connecting sections extending between the spring arms can also be situated at different heights—in other words, in different planes—wherein the different planes can be aligned at least approximately perpendicular or oblique to the longitudinal central axis.

The invention also relates to a device for compensating for tolerances between components which will be connected to a base element, having a compensating element which engages with the base element and in which a passage is formed for a connecting means, and having a spring element of the type described above, which is arranged in the passage of the compensating element.

The invention will be described in the following, purely by way of example, using possible embodiments with reference to the accompanying drawings, wherein:

FIG. 1 shows a perspective view of a spring element according to a first embodiment;

FIG. 2 shows a perspective view of a spring element according to a second embodiment;

FIG. 5 shows a partial perspective sectional view of the spring element of FIG. 3 accommodated in a compensating element;

FIG. 6 shows a top view of the spring element of FIG. 3 accommodated in the compensating element;

FIG. 7 shows a partial sectional view of a spring element accommodated in a compensating element, with a connecting means in a pre-assembly position; and FIG. 8 shows a detailed partial sectional view of the spring element accommodated in the compensating element, with the connecting means in an assembled position.

Figure 3:
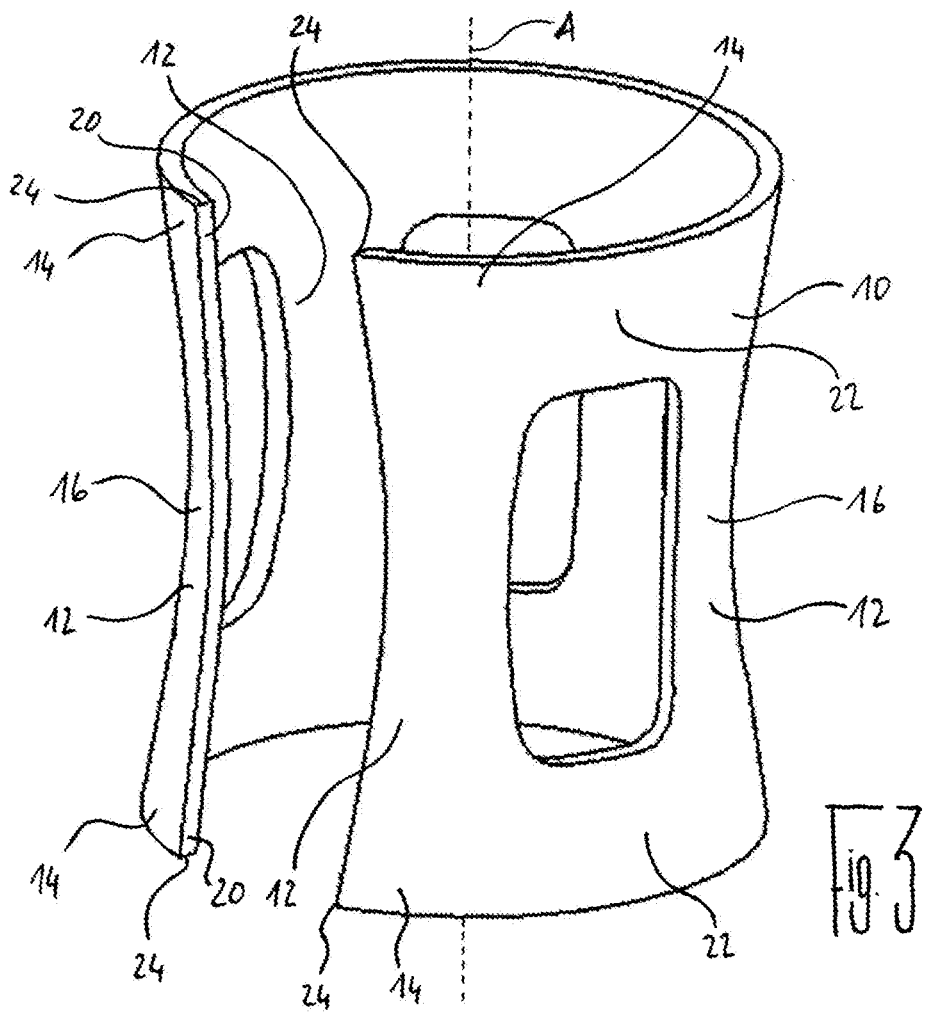
FIG. 3 shows a perspective view of a spring element according to a third embodiment.
Figure 4:
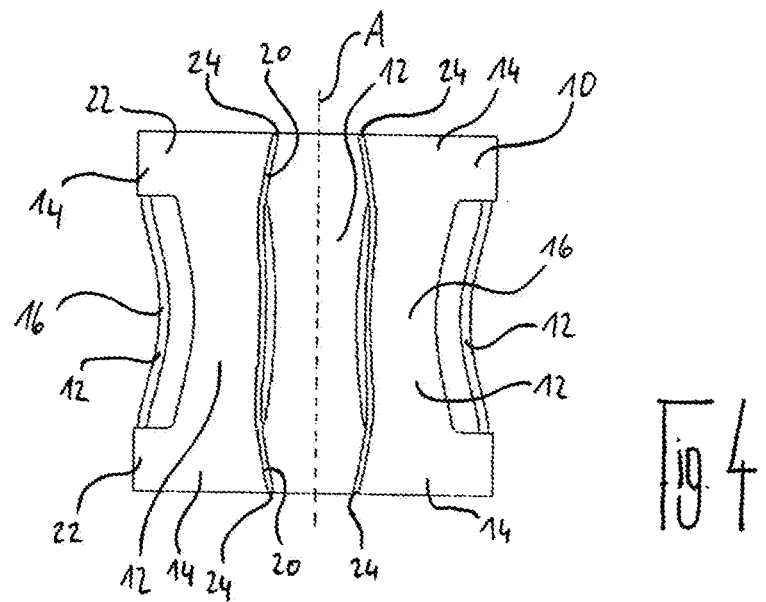
FIG. 4 shows a side view of the spring element of FIG. 3.

In some embodiments, provided for is a device for compensating for tolerances between a first and second component, having a base element 34, having a compensating element 28 in which a passage 26 is formed for a connecting means, which engages with the base element 34 by means of a threading, and having a spring element 10 arranged in the passage 26 of the compensating element 28, wherein the spring element 10 comprises at least one spring arm 12 which, as seen in its longitudinal direction, has two opposite end regions 14, wherein at least one of the end regions 14 has a greater distance from a longitudinal central axis A of the spring element 10 than an intermediate section 16 of the spring arm 12 situated between the end regions 14, and wherein at least one of the end regions 14 forms a corner 24 which protrudes radially outwards.

FIG. 1 shows a spring element 10 according to a first embodiment. The spring element 10 shown has five spring arms 12 arranged around a longitudinal central axis A of the spring element 10, wherein a longitudinal extension of each spring arm 12 is at least approximately aligned with the longitudinal central axis A.

Each spring arm 12 has, as seen in the longitudinal direction, two opposite end regions 14 between which an intermediate section 16 of the spring arm 12 is found. The two end regions 14 of the spring arm 16 in this case are radially further removed from the longitudinal central axis A than the intermediate sections 16. In other words, the end regions 14 are pushed radially outwards along the axial direction, while the intermediate sections 16 curve radially inward in the direction of the longitudinal central axis A.

The spring arms 12 are connected to each other by a connecting ring 18 which is interrupted by a slot 20. The slot 20 is aligned at least approximately parallel to the longitudinal central axis A and is bounded by two adjacent spring arms 12. Moreover, the connecting ring 18 comprises connecting sections 22 which are each situated between two adjacent spring arms 12. In the embodiment shown in FIG. 1, the connecting sections 22 transition into the intermediate sections 16 of the spring arms 12, while the end regions 14 of the spring arms 12 are not connected.

The end regions 14 of the spring arms 12 which bound the slot 20 and face the slot 20 each have a corner 24 on the side facing the slot 20, which protrudes radially outward. The function thereof will be explained in more detail in the context of FIGS. 5 and 6. It should be understood that the other spring arms 12, which do not bound the slot 20, can have end regions 14 with corners which protrude radially outwards 24.

As can be seen from FIG. 1, the connecting ring 18 extends centrally between the respective end regions 14 of each spring arm in a plane which is at least approximately aligned perpendicular to the longitudinal central axis A—that is, all connecting sections 22 are at the same height. In principle, however, the connecting ring 18 can also lie in a plane which is oriented transverse to the longitudinal central axis A. Moreover, the connecting ring 18 does not necessarily have to be formed centrally between the end regions 14; it can also be offset in the axial direction.

FIG. 2 shows a second embodiment of a spring element 10, which differs from the first embodiment in that the connecting ring 18 is not formed at the height of the intermediate section 16, but rather on an axial end of the spring element 10. Each spring arm 12 thus has an unconnected free end region 14 and an opposite, connected end region 14 which is connected by the connecting ring 18 to an end region 14 of an adjacent spring arm 12.

FIG. 3 shows a third embodiment of a spring element 10, which differs from the preceding embodiments in that there are two connecting rings 18, wherein the one connecting ring 18 connects one of the end regions 14, and the other connecting ring 18 connects the other, opposite end regions 14 of the spring arms 12.

The function of the corners which protrude radially outwards 24 and are formed on the spring arms 12 bounding the slot 20 will be described in the following with reference to FIGS. 5 and 6 using the example of a spring element 10 according to the third embodiment purely as an example. It should be understood that the teaching described below can also be transferred to the spring elements 10 according to the first and second embodiments.

The spring element 10 is, when in a pre-assembly state—that is to say, when the spring element 10 has not yet been arranged in the passage 26 of a compensating element 28—oversized compared to the passage 26 of the compensating element 28. If the spring element 10 is inserted into the passage 26, the connecting rings 18 are compressed while opposing a spring force of the connecting rings 18, wherein the spring arms 12 which bound the slot 20 are moved towards each other. An appendage or projection 31 constructed in the passage 26 of the compensating element 28 precludes the spring element 10 from being pushed through the passage 26 and out of the compensating element 28.

When the spring element 10 is seated in the passage 26, the spring force of the connecting rings 18 causes the corners which protrude radially outwards 24 to be pressed into the compensating element 28. This effect is additionally reinforced when a connecting means 30 (FIG. 7) is pushed through the passage 26, thereby pressing the spring arms 12 bounding the slot 20—and thus also the corners 24 formed thereon—radially outwards. As a result, the corners 24 are pressed further into the compensating element 28. At this point, if a rotational movement is transmitted to the spring element 10 by the connecting means 30, this leads to the corners which protrude radially outwards 24 additionally wedging in the passage 26 of the compensating element 28, thus ultimately achieving a torque-proof mounting of the spring element 10 relative to the compensating element 28, such that a rotational movement of the connecting means 30 can be reliably transmitted to the compensating element 28.

Moreover, the corners 24 of the spring arms 12 pressed into the compensating element 28 prevent the spring element 10 from slipping out of the compensating element 28 in the axial direction when the connecting means 30 is pulled out. The spring element 10 lingers in the compensating element 28 to a certain extent. As a result, there is no need for an additional axial fixation of the spring element 10 in the passage 26 of the compensating element 28 against the joining direction of the connecting means 30.

When the connecting means 30 is inserted into the spring element 10 arranged in the passage 26, it is advantageous that the end regions 14 of the spring arms 12 are at a greater distance from the longitudinal central axis A of the spring element 10 than the intermediate sections 16 between the end regions 14. As a result, the connecting means 30 is guided through the intermediate sections 16 of the spring arms 12 during the insertion into the spring element 10, and the plurality of spring arms 12 causes the connecting means 30 to be centered in the passage 26 of the compensating element 28 such that, ideally, the longitudinal central axis A, a longitudinal central axis B of the compensating element 28, and a longitudinal central axis C of the connecting means 30 coincide. This prevents the spring element 10 from wedging in the passage 26 of the compensating element 28 and being damaged during the insertion of the connecting means 30.

Moreover, the force to be applied during the insertion of the connecting means 30 into the spring element 10 arranged in the passage 26 diminishes progressively as the penetration depth progresses, as will now be explained with reference to FIGS. 7 and 8. If the connecting means 30, which is designed in this case in the form of a screw, has not yet been inserted very far into the spring element 10, then an angle $\alpha$ between a shaft 32 of the connecting means 30 and the intermediate sections 16 of the spring element 10 curved in the direction of the longitudinal central axis A has a maximum value. With increasing penetration depth of the connecting means 30, the spring arms 12 are pressed by the shaft 32 of the connecting means 30 radially outward, such that the angle $\alpha$ is smaller. Since the force to be applied in the axial direction during insertion of the connecting means 30 is directly proportional to the angle $\alpha$, and the angle $\alpha$ decreases with increasing penetration depth of the connecting means 30, the force to be applied in the axial direction also decreases. As a result, it is progressively easier to push the connecting means 30 through the compensating element 28.

The spring elements 10 described above are punched bent parts, which are preferably made of spring steel. It is advantageous in this case, as can be seen from FIG. 6, that, in the case of a spring element 10 with five spring arms 12, an internal angle $\beta$ between two adjacent spring arms 12 can be kept greater than 90°, wherein the internal angle $\beta$ is all the greater when the spring element 10 has more spring arms 12. There is accordingly less need to bend the spring steel as much during the production of a spring element 10, which facilitates the production of a spring element 10. It should be understood that a spring element 10 can also be produced by other methods—such as by injection molding of plastic materials.

Finally, it should be noted that although the spring elements 10 shown in the embodiments each have five spring arms 12, the number of spring arms 12 can also differ from five, such that a spring element 10 can have more or less than five—but preferably at least three—spring arms 12. Moreover, the distances between the spring arms 12 as seen in the circumferential direction need not be equidistant. Rather, the spring arms 12 can also have different distances from each other.

LIST OF REFERENCE NUMBERS 10 spring element
12 spring arm
14 end region
16 intermediate section
18 connecting ring
20 slot
22 connecting section
24 corner
26 passage
28 compensating element
30 connecting means
31 projection
32 shaft α angle
ß internal angle
A longitudinal central axis
B longitudinal central axis
C longitudinal central axis

The invention claimed is:

1. A device for compensating for tolerances between a first and second component, the device comprising:
a base element;
a compensating element in which a passage is formed for a connecting means, the compensating element engaging with the base element by means of a threading; and
a spring element arranged in the passage of the compensating element;
wherein the spring element comprises at least one spring arm which, as seen in its longitudinal direction, has two opposite end regions,
wherein at least one of the two opposite end regions has a greater distance from a longitudinal central axis of the spring element than an intermediate section of the spring arm situated between the two opposite end regions, and
wherein at least one of the two opposite end regions forms a corner which protrudes radially outwards to an extent that the corner pushes into the compensating element when the spring element is situated in the passage of the compensating element to non-rotatably mount the spring element in the passage of the compensating element.

2. The device according to claim 1, wherein each spring arm has a longitudinal extension, wherein the longitudinal extension of a spring arm and the longitudinal central axis are approximately in alignment.

3. The device according to claim 1, wherein each spring arm as seen in the longitudinal direction has two opposite end regions, wherein at least one end region has a greater distance from the longitudinal central axis than an intermediate section of a spring arm situated between the end regions.

4. The device according to claim 1, wherein a plurality of spring arms is arranged around the longitudinal central axis of the spring element, and the plurality of spring arms are connected to each other by means of a connecting ring.

5. The device according to claim 4, wherein the connecting ring as seen in the axial direction is formed between unconnected end regions of the spring arms.

6. The device according to claim 4, wherein each spring arm has an unconnected end region and an opposite, connected end region, wherein connected end regions are connected by the connecting ring.

7. The device according to claim 1, wherein at least three spring arms are arranged around the longitudinal central axis of the spring element, and the at least three spring arms are connected to each other by means of a connecting ring.

8. The device according to claim 7, wherein the connecting ring as seen in the axial direction is formed between unconnected end regions of the spring arms.

9. The device according to claim 7, wherein each spring arm has an unconnected end region and an opposite, connected end region, wherein connected end regions are connected by the connecting ring.

10. The device according to claim 1, wherein both the first end regions and the opposite end regions, respectively, are each connected by a connecting ring.

11. The device according to claim 1, wherein the connecting ring has a slot, the slot being aligned at least approximately parallel to the longitudinal central axis of the spring element.

12. The device according to claim 11, wherein the slot is bounded by two adjacent spring arms.

13. The device according to claim 11, wherein at least one end region of a spring arm facing the slot has a corner which protrudes radially outwards.

14. The device according to claim 1, wherein the spring element is made of a metal.

15. The device according to claim 14, wherein the spring element is made of a spring steel.

16. The device according to claim 1, wherein the connecting ring extends in a plane which is aligned at least approximately perpendicular to the longitudinal central axis.

* * * * *